United States Patent [19]

Cortez, Jr.

[11] Patent Number: 4,778,154

[45] Date of Patent: Oct. 18, 1988

[54] WELDING TORCH CARRIAGE

[76] Inventor: Crespin Cortez, Jr., Box 6207, 316 Ave. East, Ingleside, Tex. 78362

[21] Appl. No.: 41,687

[22] Filed: Apr. 23, 1987

[51] Int. Cl.$^4$ .............................................. B23K 7/10
[52] U.S. Cl. ...................................... 266/66; 266/67; 266/68
[58] Field of Search ............................ 266/66, 67, 68

[56] References Cited

U.S. PATENT DOCUMENTS

| | | | |
|---|---|---|---|
| 1,139,048 | 5/1915 | Messer | 266/66 |
| 1,505,106 | 8/1924 | Schröder | 266/66 |
| 4,344,606 | 8/1982 | Dillon | 266/67 |
| 4,405,117 | 9/1983 | Ohlaug | 266/67 |

*Primary Examiner*—Wayland Stallard
*Attorney, Agent, or Firm*—Leon Gilden

[57] ABSTRACT

A wheeled holder is designed to hold and carry a welding torch stably along a chosen welding line. The holder includes adjusting means for varying the mounting position of the torch relative to the wheels. The circumferential edge of each wheel is designed as a knife edge to improve the holder's ability to be steered along a curved line.

4 Claims, 3 Drawing Sheets

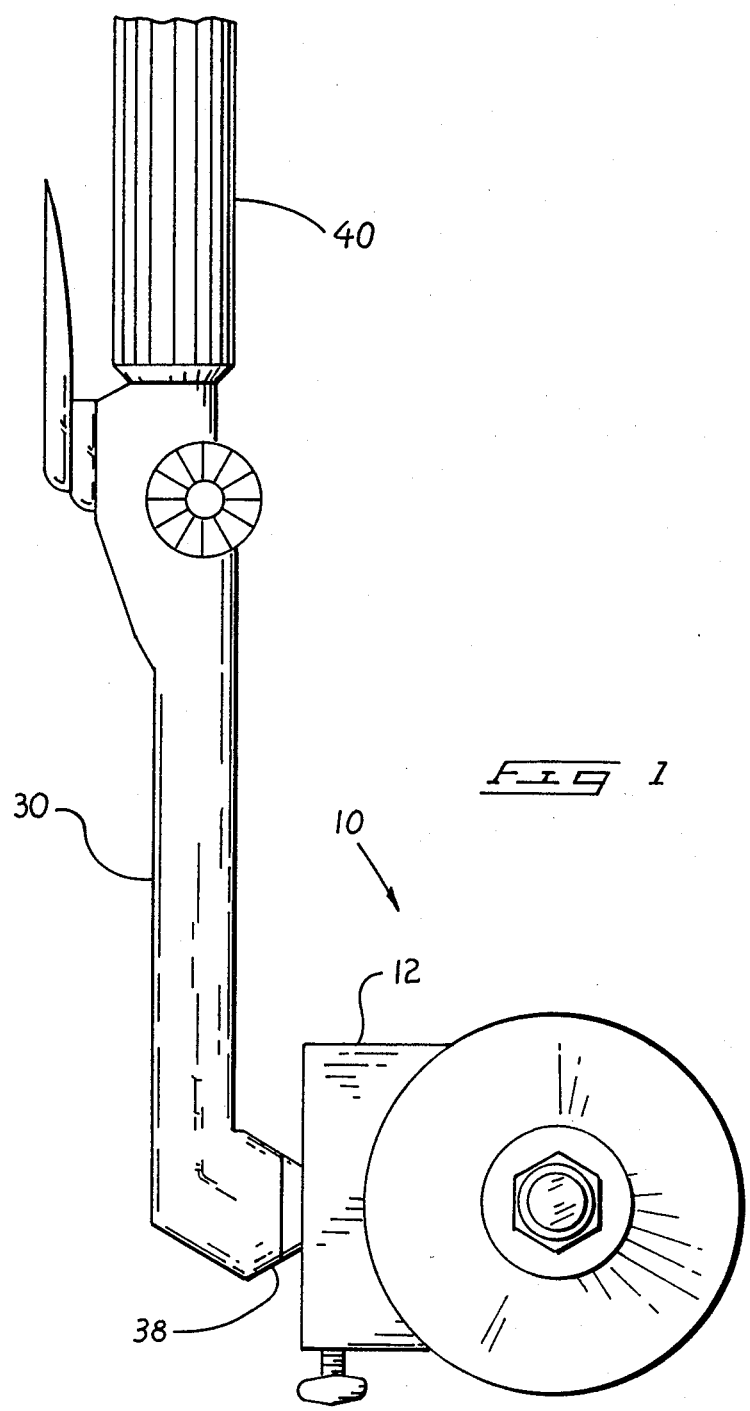

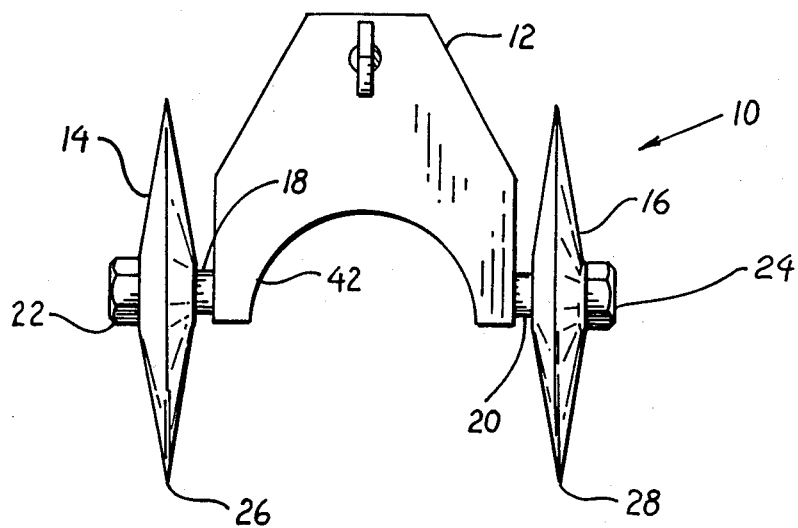
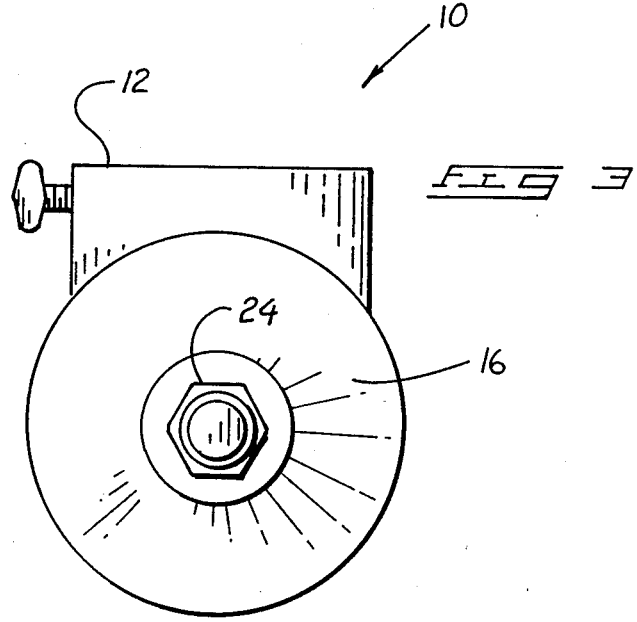

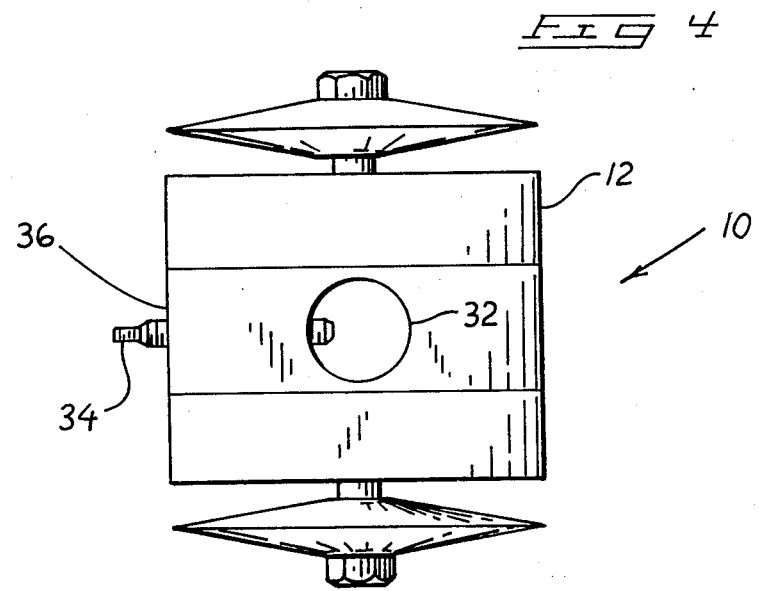

WELDING TORCH CARRIAGE

BACKGROUND OF THE INVENTION

1. Field of the Invention

The present invention relates to welding equipment, and more particularly pertains to a new and improved device which is capable of carrying various types of welding torches during a use thereof.

2. Description of the Prior Art

The use of welding torch holding and guiding devices is well known in the prior art. For example, U.S. Pat. No. 3,675,841, which issued to Gutlheber et al on July 11, 1972, discloses such a device. The apparatus illustrated in this patent is representative of a number of known prior art devices and includes the use of a wheeled carriage movable along rails mounted on a workpiece. While being functional for its intended purpose, it can be appreciated that this apparatus lacks flexibility of use due to the necessity of utilizing prepositioned rails.

Another device of interest is to be found in U.S. Pat. No. 4,328,412, which issued to Watanabe, et al on May 4, 1982. Disclosed in this patent is a motor-driven welding machine capable of carrying a welding torch along a cutting line, and associated carriage wheels permit selected steering of the apparatus. While also most likely functioning in its intended manner, a review of this patent will reveal that the apparatus disclosed therein is substantially complex in design which would of course result in substantial manufacturing expenses. These high costs of manufacture are most likely the reason that this device has met with little or no commercial success.

As such, it can be appreciated that there exists a continuing need for new and improved welding torch holding and guiding devices wherein such devices can be inexpensively manufactured while being efficient and reliable in their operation. In this respect, the present invention addresses this need.

SUMMARY OF THE INVENTION

In view of the foregoing disadvantages inherent in the known types of welding torch carrying and guiding devices now present in the prior art, the present invention provides an improved welding torch carrying and guiding device wherein the same includes adjusting means for fixedly securing a torch thereto and further includes wheels having sharp peripheral edges which facilitate the steering movement of such device. As such, the general purpose of the present invention, which will be described subsequently in greater detail, is to provide a new and improved welding torch carrying and guiding device which has all the advantages of the prior art welding torch holding and carrying devices and none of the disadvantages.

To attain this, the present invention comprises a holding device to which a welding torch can be operably mounted, with the device further including a pair of wheels for facilitating a movement of the torch once the same has been attached thereto. The cutting end of the torch is fixedly secured within an aperture formed in a topmost portion of the holder, and the torch is adjustably positionable within this aperture to obtain the desired flame spacing relative to the workpiece. Nonlinear movement of the torch is permitted by providing the wheels with a circumferentialy extending knife edge. As such, only a point contact between an edge portion of each wheel and the supporting surface is achieved. This of course greatly enhances the aforementioned nonlinear movement of the cutting torch during a use thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cutting torch carriage which has all the advantages of the prior art cutting torch carriages and none of the disadvantages.

It is another object of the present invention to provide a new and improved cutting torch carriage which may be easily and efficiently manufactured and marketed.

It is a further object of the present invention to provide a new and improved cutting torch carriage which is of a durable and reliable construction.

An even further object of the present invention is to provide a new and improved cutting torch carriage which is susceptible of a low cost of manufacture with regard to both materials and labor, and which accordingly is then susceptible of low prices of sale to the consuming public, thereby making such cutting torch carriages economically available to the buying public.

Still yet another object of the present invention is to provide a new and improved cutting torch carriage which provides in the apparatuses and methods of the prior art some of the advantages thereof, while simultaneously overcoming some of the disadvantages normally associated therewith.

Still another object of the present invention is to provide a new and improved cutting torch carriage which is useful for the training of individuals in the proper manner of utilizing a cutting torch.

Yet another object of the present invention is to provide a new and improved cutting torch carriage which provides for an easy nonlinear movement of the torch attached thereto.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevation view of the cutting torch carriage comprising the present invention.

FIG. 2 is a front elevation view of the invention.

FIG. 3 is a side elevation view of the carriage showing the torch removed therefrom.

FIG. 4 is a top plan view of the carriage.

DESCRIPTION OF THE PREFERRED EMBODIMENT

With reference now to the drawings, and in particular to FIGS. 1-4 thereof, a new and improved cutting torch carriage embodying the principles and concepts of the present invention and generally designated by the reference numeral 10 will be described.

More specifically, it will be noted that the cutting torch carriage 10 essentially comprises a holder 12 having a pair of wheels 14, 16 operably mounted thereto. The wheels 14, 16 are respectively mounted on axles 18, 20, and respective threaded fasteners 22, 24 are used to rotatably attach the wheels to the axles in a conventional manner.

As best illustrated in FIGS. 2 and 4, the wheels 14, 16 are designed to decrease in thickness in a radial direction so as to define respective knife edges 26, 28 about peripheral portions thereof. The knife edges 26, 28 allow only a point contact between the respective wheels 14, 16 and their supporting surface, thereby to facilitate easy nonlinear movement of the holder 12 when a cutting torch 30 is operably attached thereto.

As clearly illustrated in FIG. 4, a top portion of the holder 12 is provided with a downwardly directed, through-extending aperture 32. A thumbscrew 34 is threadably retained in a further aperture 36 which is in orthogonal alignment with the aperture 32. As illustrated in FIG. 1, a cutting end 38 of a torch 30 may be inserted within the aperture 32, and the thumbscrew 34 can then be threadably moved into engagement with the cutting end to thus fixedly secure the torch in position within the aperture. In this position, the torch 30 is supported by the wheels 14, 16, and a user can then grasp the handle 40 to operably use the torch in a conventional manner.

A further noteworthy feature of the present invention is clearly illustrated in FIG. 2. In this respect, it can be seen that a bottom portion of the holder 12 includes a concavely-shaped cavity 42. When the torch end 38 is inserted within the aperture 32, an end portion by the torch 30 will extend into the concavity 42 so as to prevent interference between the flame and the holder 12. Further, the concavity 42 operates as a heat reflection shield which increases the temperature of the workpiece during a cutting thereof of the torch 30. Inasmuch as the wheels 14, 16 are in contact only at points 26, 28, very little heat is conducted from the workpiece into the wheels. Accordingly, the holder 12 and its associated wheels, 14, 16 remain relatively cool during a use of the cutting torch 30. As such, the device 10 can be utilized on a regular basis in combination with a cutting torch 30 or alternatively, it can be utilized as a training device with the intent being to teach a user the proper angle and spacing required when cutting materials with a torch.

As to the manner of usage and operation of the present invention, the same should be apparent from the above description. Accordingly, no further discussion of the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved cutting torch holder and training device comprising:
   body means having a torch tip receiving aperture formed therein:
   torch securing means for fixedly securing said torch tip to said body means; and
   wheel means operably attached to said body means, said wheel means including a peripheral knife edge portion, whereby said wheel means are in point contact with a supporting surface, and
   wherein said torch securing means comprises a thumbscrew operably movable within said torch tip receiving aperture, and
   further including heat reflecting means forming a part of said body means, said heat reflecting means being operable to reflect heat from said body means towards said workpiece during a use of said cutting torch, and
   wherein said heat reflecting means comprises a concavely shaped cavity formed in a bottom portion of said body means, said torch tip being positioned within said cavity when said cutting torch is attached to said body means.

2. The new and improved cutting torch holder and training device as described in claim 1, and further including cooling means for substantially reducing heat conduction between said workpiece and said body means during a use of said cutting torch.

3. The new and improved cutting torch holder and training device as described in claim 2, wherein said cooling means comprises said peripheral knife edge forming a part of said wheel means.

4. The new and improved cutting torch holder and training device as described in claim 3, wherein said torch securing means comprises a thumbscrew in orthogonal alignment with said torch tip receiving aperture, said thumbscrew being adjustably movable to fixedly secure said torch tip within said aperture.

* * * * *